Dec. 2, 1941.   W. S. GLENNAN   2,264,971
COOLING DEVICE
Filed March 10, 1939

INVENTOR
William S. Glennan
BY
Pennie Davis Marvin & Edmonds
ATTORNEYS

Patented Dec. 2, 1941

2,264,971

UNITED STATES PATENT OFFICE 2,264,971

COOLING DEVICE

William S. Glennan, Norfolk, Va.

Application March 10, 1939, Serial No. 261,004

2 Claims. (Cl. 62—1)

This invention has to do with cooling devices made of glass or other plastic material in which a liquid or other substance is hermetically sealed, so that when the contained substance is frozen the device may be used in the manner of the "ice cubes" of the ordinary domestic refrigerator.

Cooling devices of this sort have an opening for the introduction of water or other substance. To close this opening presents one of the chief problems. The closure must be such as to seal the device hermetically. It must be a closure that can be applied in simple fashion, so as to lessen the manufacturing cost, and without injury to the material forming the container proper. For instance, heating is to be avoided because a glass container, for example, is likely when heated to be subjected to strains which cause breakage either during application of the closure or subsequently. A further requirement is that the closure be one that furnishes a tight seal despite the variations in size and configuration of the opening which are inevitable in everyday production of the container. The adhesive sealing material that is used must be such as to maintain its properties despite its constant exposure to moisture and its occasional exposure to fruit juices, alcohol, etc., and despite its repeated subjection to considerable changes in temperature in the course of freezing and melting of the contained liquid, involving differential expansion and contraction of the closure and the container. Moreover, the adhesive seal and the method of applying it must be such as to avoid contamination of the liquid in the container, for that would give it an unattractive appearance.

The object of the invention is to provide a simple and reliable closure, and method of sealing, meeting these requirements.

In the drawing, which illustrates practical embodiments of my improvements,

Figure 1:
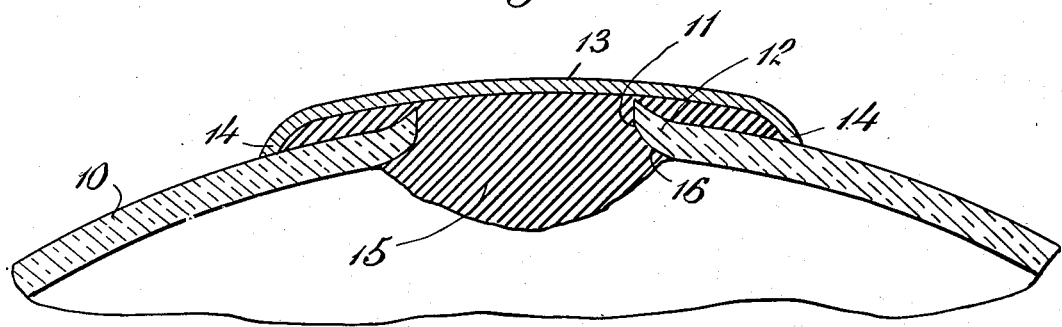
Figure 1 is a view in section through the sealing means, with reference to which both the improvements in method and in product can be understood.
Figure 2:
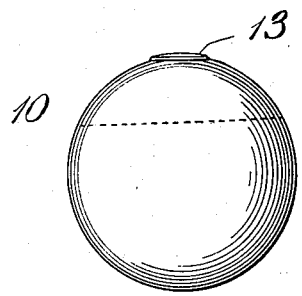
Figure 2 is a view in elevation of a finished article embodying these improvements.
Figure 3:
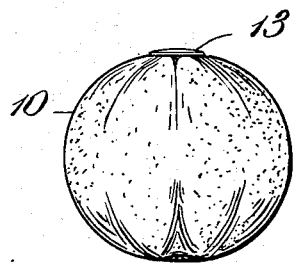
Figure 3 is a similar view of such an article, further characterized by having the surface configuration and a simulation of the surface texture of a piece of fruit.

The container or shell 10 illustrated here is of glass which is blown into a sphere, in the form shown in Fig. 2, or into a shape simulating a piece of fruit, in the form shown in Fig. 3, a mold being used in the latter case. An opening 11 is left in this container to permit introduction of the liquid. In large scale production, it frequently happens that a slight lip or projection 12, or other irregularity, is left at the rim of this opening. With reasonable care, the extent to which this lip projects can be limited, but the exact extent of the projection can not be controlled and as a result variations in it will occur. The same is true in general of other irregularities, including those that occur with molded articles of irregular contour such as the simulated fruit of Figure 3.

The present invention makes it possible to seal the opening without regularly resorting to a preliminary operation to remove such irregularities. It permits application of a closure regardless of the presence of a slight projection or irregularity, or of its extent within the limits that can be maintained feasibly in regular manufacture.

The closure element here consists of a thin metal cap 13 which is a disc slightly dished or concave with an inturned rim 14. This cap is considerably larger than the opening 11 in the container so that it overlies a considerable area around the opening. The portion of the shell surface immediately surrounding the opening is laterally extended from the opening, as distinguished from a vessel having a neck. In consequence of this shaping, the cap when applied over the opening rests with its rim in engagement with the surface of the container or so close to it as to leave an immaterial gap despite the variations which occur in the extent to which the lip 12 projects above the surface of the container. The body of the cap thus clears the underlying surface of the container, with the exception that in an extreme case the lip 12 may touch the cap at some points. This clearance affords room for the adhesive, and thus provides for adhesive and sealing action over a considerable surface area between the cap and the container, but without exposing the adhesive seal to view around the edge of the cap.

The adhesive seal 15, described more fully below, is of such a nature that initially it is in a plastic condition but in a short time "sets" as a firm and relatively hard mass, capable however of yielding somewhat. It is prepared in small batches so that it will not take its "set" before being used. The closure or cap 13 is picked up by small pincers and a small gob of the adhesive material is scooped up by using the cap as a sort of spoon, the adhesive adhering to the inner face of the cap. The cap is then put in place over the opening in the container and is pressed into place with a very light pressure, to avoid deforming the thin metal. The permissible pressure is sufficient however to force the adhesive material into the opening 11 in the container, and to cause it to spread over the surface of the container around the opening, filling the space between that surface and the cap. The adhesive expands slightly upon setting and spreads to some extent within the container thus forming an anchor 16 where it underlies the rim of the opening 11.

Before putting the closure in place, the containers are mounted in a rack. The liquid, filtered to eliminate any solid matter which might settle and give an unattractive appearance, is introduced into the containers, to about the level indicated by the dotted line in Figure 2. This level is such as to leave space for expansion upon freezing and moreover is preferably so chosen that the finished article is slightly lighter than the volume of liquid it displaces, causing it to just float in the beverage in which it is placed. The containers are then dried so that there will be no moisture around the opening to mix with the adhesive, which before taking its set has a tendency to mix with water, with the result that small particles of it might get into the liquid in the container. It is desirable to have the room temperature such that moisture will not condense on the interior of the container, where it might cause a smear.

After drying, the containers are mounted in a rack which holds them firmly so as to avoid tipping or vibration during the sealing operation which follows. The closure cap is then applied in the manner described above. After a period of about 2 hours, when the adhesive has set somewhat but is still fairly soft, excess adhesive material on the surface of the container around the cap or on the cap itself is removed. The adhesive sealing material has sufficient tenacity to enable this excess to be peeled off, the rim of the cap serving as a cutter which prevents the adhesive within the cap from being drawn out if the pull is upward against the edge of the cap rather than horizontal.

At this point the adhesive within is sufficiently firm so that, if done carefully, this cleaning of the surface does not disturb the adhesive. The articles are then allowed to stand for a period of about 12 hours during which the adhesive takes its final "set." The articles are then buffed to remove any remaining traces of adhesive and to polish the outer surface of the closure.

The adhesive sealing material is a latex compound of a type available on the market. Such compounds commonly contain casein or similar materials, with fillers, stabilizers, preservatives or other modifying or supplementing agents. The latex compound is easily applied when in its initial plastic state, gives good adhesion between glass and metal, effectively seals the joint against the liquids in which these cooling devices are used, is non-toxic, and is unaffected by the repeated freezings that are incident to their use. It yields sufficiently, without material disturbance, to take up the differential expansion and contraction of the cap and the container.

The combination of a material of this type with the cap described, which spans the opening in the container, clearing any irregularities at the opening and providing space for the adhesive seal between the cap and the surface it overlies, effectively solves the problem of sealing these cooling devices made of glass or like material.

I claim:

1. A cooling device of the sort described comprising a shell having an opening for the introduction of the liquid that is sealed in the shell and is frozen when the device is used, the portion of the shell surface immediately surrounding the opening being laterally extended therefrom, a closure for said opening comprising a thin metal cap larger than the opening and extending laterally to overlie the said portion of the shell surface, and having an inturned rim spacing the body of the cap slightly from said portion of the shell surface, in combination with a water resistant adhesive seal between the cap and the said portion of the shell surface.

2. A cooling device of the sort described comprising a blown plastic shell having an opening for the introduction of the liquid that is sealed in the shell and is frozen when the device is used, the rim of said opening being subject to irregular shaping incident to formation of the opening, and the portion of the shell surface immediately surrounding the opening being laterally extended therefrom, a permanent closure for said opening comprising a thin metal cap slightly dished and larger than the opening and extending laterally to overlie the said portion of the shell surface, and having an inturned rim spacing the body of the cap slightly from said portion of the shell surface, in combination with a water resistant latex compound forming an adhesive seal between the cap and the said portion of the shell surface.

WILLIAM S. GLENNAN.